United States Patent [19]
Robert

[11] Patent Number: 5,328,413
[45] Date of Patent: Jul. 12, 1994

[54] DRIVING PULLEY

[75] Inventor: Jean Robert, Drummondville, Canada

[73] Assignee: Powerbloc IBC Canada Inc., Drummondville, Canada

[21] Appl. No.: 83,362

[22] Filed: Jun. 28, 1993

[51] Int. Cl.⁵ ............................................. F16H 59/00
[52] U.S. Cl. ........................................................ 474/13
[58] Field of Search ................................ 474/8, 11–17

[56] References Cited

U.S. PATENT DOCUMENTS

| | | | |
|---|---|---|---|
| 3,266,330 | 6/1966 | Galleher | 74/230.17 |
| 4,284,408 | 8/1981 | Boer et al. | 474/14 |
| 4,634,405 | 1/1987 | Quick et al. | 474/13 |
| 4,826,467 | 5/1989 | Reese et al. | 474/14 |

*Primary Examiner*—Thuy M. Bui
*Attorney, Agent, or Firm*—Merchant & Gould, Smith, Edell, Welter & Schmidt

[57] ABSTRACT

A driving pulley used in a variable speed transmission is adapted to receive a trapezoidal belt by which power is transmitted from the driving pulley to a driven pulley. The driving pulley is provided with radial pins connected to the shaft and movable inside respective apertures delimited by ramps for limiting sliding and rotating movements of the movable flange within predetermined limits with respect to the shaft and for imposing a specific mechanical behavior to the movable flange. It allows additional control of the engine speed under full throttle, reducing the overrun and helping the transmission return to its smallest ratio during a quick vehicle slowdown.

11 Claims, 5 Drawing Sheets

DRIVING PULLEY

FIELD OF THE INVENTION

The present invention relates to a driving pulley used in a variable speed transmission adapted to receive a trapezoidal belt by which power is transmitted from the driving pulley to a driven pulley.

BACKGROUND OF THE INVENTION

Trapezoidal belt variable speed transmissions are commonly used on small vehicles such as snowmobiles, scooters or small cars. Such transmissions substantially comprise a driving pulley, a trapezoidal belt and a driven pulley. The driving pulley is linked to an engine and the driven pulley is usually mechanically connected to ground traction means, such as wheels or tracks.

The main object of using a variable speed transmission is to automatically change the winding diameter of the trapezoidal belt around the driving and the driven pulleys in order to have a maximum torque at low speeds and a reasonable engine rotation speed at high speeds. The sides of the trapezoidal belt are, on each pulley, gripped between two opposite flanges wherein one is fixed and one is movable. At low speeds, the winding diameter of the driving pulley is very small and the winding diameter of the driven pulley is maximum. As the rotation speed of the driving pulley increases, the movable flange of the driving pulley gets closer to the fixed flange and thus forces the trapezoidal belt to wind on a greater diameter.

The changes in the winding diameter is due to the presence of flyweights under the influence of the centrifugal force. The flyweights generate an axial moving force on the movable flange, forcing it to get closer to the fixed flange. The axial moving force is counterbalanced by a helicoidal spring, coaxially mounted around the shaft, generating an axial biasing force opposed to the axial moving force of the flyweights. In addition to the biasing force generated by the helicoidal spring, there is another axial biasing force which is generated by the belt itself because of its winding tension pushing inwardly on the flanges of the conical walls, thereby forcing the movable flange to move away from the fixed flange. Therefore, the movement of the movable flange is a function of the equilibrium between the axial forces of the flyweights, the spring and the belt.

Since the length of the trapezoidal belt is not substantially stretchable, the trapezoidal belt exerts a radial force towards the center on the flanges of the driven pulley in addition to the tangential driving force. This radial force constrains the driven pulley to have a smaller winding diameter. Therefore, the movable flange of the driven pulley moves away from the other until the return force exerted by a spring counterbalances the radial force exerted by the trapezoidal belt. It should be noted at this point that a change in the load also produces a change in the winding diameters of the pulleys, a greater load inducing a greater winding diameter of the driven pulley.

When the rotation speed of the engine decreases, the winding diameter of the driving pulley decreases and the radial force exerted by the trapezoidal belt decreases, thus allowing the driven pulley to have a greater winding diameter.

An example of such a variable speed transmission is disclosed in U.S. Pat. No. 3,266,330.

One of the drawbacks with the conventional driving pulleys is a lack of sensitivity to throttle opening. This problem occurs when the vehicle is travelling at a moderate cruising speed and the driver wants to accelerate full throttle, such as when the vehicle is travelling at 100 km/h and the driver wants to pass another vehicle. The driver then opens wider the throttle of the engine which in return generates a higher torque. Due to the driven pulley reaction, the winding tension in the belt then increases, pushing the movable flange away from the fixed flange until another equilibrium is obtained between the flyweights, the spring and the belt. Therefore, the winding diameter then changes to a lower ratio, sending more torque to the wheels of the vehicle to accelerate it.

The ideal transmission would allow the engine speed to be very low at moderate cruising speed in order to reduce fuel consumption and noise. Yet it would allow very high engine speed whenever throttle is fully opened, thereby getting maximum power from the engine. The problem encountered with conventional variable speed transmissions is that a rise in the engine speed is limited. If the transmission is designed to allow low engine speed at moderate cruising speed, then under full throttle, the engine speed is too low. If the transmission is designed to reach high engine speeds at full throttle, then at moderate cruising speed, the engine speed is too high.

A second drawback of conventional driving pulleys in variable speed transmissions is the response delay when the belt is required to quickly change its winding diameter. This problem is noticed mainly when the vehicle is fully accelerated from standstill. The transmission would ideally stay in its lowest ratio until engine reaches its designed shifting speed. Then the winding diameter of the driving pulley should quickly increase to keep the engine speed nearly constant. The delay in belt response causes the ratio to stay too long in lowest position, thereby allowing the engine to overrun during a short period before it stabilizes at the desired value. This problem is known as "overshoot".

A third drawback of conventional driving pulleys in variable speed transmissions is also due to the belt response delay. When the vehicle is rapidly slowed down, the belt should move rapidly from a large to a small winding diameter in the driving pulley, so that when the vehicle stops, the transmission should be in the lowest ratio, ready to provide full torque output on reaccelerating. Due to delay in belt response, the radial belt pull is less than ideal, and the belt does not return to its smallest winding diameter in the driving pulley at the precise moment where the belt stops turning.

SUMMARY OF THE INVENTION

The object of the present invention is to provide additional control of the engine speed under full throttle, while not modifying the basic transmission shift pattern under part throttle operation. This resolves the lack of engine response to throttle opening by making the driving pulley sensitive to high engine torques. Under moderate engine torque, the driving pulley position is controlled by the equilibrium of the flyweights, the spring and the belt pull, as in a conventional transmission. But during full throttle, opening with the transmission is set to high ratio, high engine torque causes a kickdown ramp to react, forcing the driving pulley apart into a lower ratio, thereby allowing engine speed to rise to the desired value.

A second advantage of the present invention is eliminating the engine overshoot problem. Under full throttle opening with the transmission in low ratio, high engine torque causes an upshift ramp to react, forcing the driving pulley to a higher ratio, thereby increasing the load on the engine and reducing its overrun to an acceptable value.

A third advantage of the present invention is to help the transmission return to its smallest ratio during a quick vehicle slowdown. When the throttle is closed and the transmission is in intermediate ratio, reverse engine torque and spring biasing torque causes a slowdown ramp to react, forcing the driving pulley apart into the lowest ratio with the desired quickness of response.

More particularly, the object of the present invention is to provide a driving pulley for a variable speed transmission, the driving pulley comprising:

a shaft having two ends;

two coaxial flanges located on the shaft, each flange having an inner conical wall facing the other for providing therebetween a V-shaped groove for a trapezoidal belt exerting substantially a radial force and a tangential force on the inner conical walls upon application of a torque on the shaft and rotation thereof, one of the flanges, hereinafter called "fixed flange", being rigidly attached at one end of the shaft and transmitting substantially the half of the torque, the other flange, hereinafter called "movable flange" being slidably and rotatably mounted on the shaft, the movable flange transmitting substantially the half of the torque;

first biasing means for generating a biasing torque opposed to the corresponding half of the torque;

second biasing means for generating an axial biasing force urging the movable flange away from the fixed flange;

centrifugal means for generating an axial moving force opposed to the axial biasing force and urging the movable flange towards the fixed flange, the axial moving force being a function of the rotation speed of the driving pulley; and means for limiting sliding and rotating movements of the movable flange within predetermined limits with respect to the shaft and for imposing a specific mechanical behaviour to the movable flange.

According to a preferred embodiment, the means for limiting sliding and rotating movements of the movable flange comprise at least two radial pins rigidly connected to the shaft, each of the pins being movable within side walls of a ramp, preferably having identical shapes, the pins and surfaces being symmetrically disposed about the shaft.

According to another preferred embodiment, the ramps are rigidly connected to the movable flange, the pins being rigidly connected to the shaft. Preferably, the ramps are apertures provided in the periphery of a hollow cylindrical cam rigidly attached to the movable flange.

According to a still preferred embodiment, the pins are outwardly projecting from holding means located within the cam and rigidly attached to the shaft.

According to a still preferred embodiment, each of the pins further comprises a roller means for reducing friction between the pin and the side walls of the corresponding aperture while resting against the side walls.

According to a still preferred embodiment, the centrifugal means comprise at least two flyweights symmetrically disposed around the shaft, each flyweight being moved radially in function of changes in the rotation speed of the driving pulley.

Holding means comprise a bearing for lowering friction between the flyweights and the holding means upon relative rotational movement between the cam and the holding means.

Preferably, the first and second biasing means consist of an helicoidal spring coaxial mounted around the shaft, the spring having a first end rigidly attached to the cam and another end rigidly attached to the holding means.

A non restrictive description of a preferred embodiment will now be given with reference to the appended drawings.

DESCRIPTION OF A PREFERRED EMBODIMENT

The driving pulley 10, according to a preferred embodiment of the invention illustrated in the accompanying drawings, is used in a variable speed transmission of a vehicle. However, it is possible to find other applications or other environments where the driving pulley 10 may be advantageously used.

The driving pulley 10 comprises a shaft 20. The shaft 20 is mechanically connected to an engine (not shown) for providing torque and to drive the driving pulley 10 into rotation.

Figure 1:
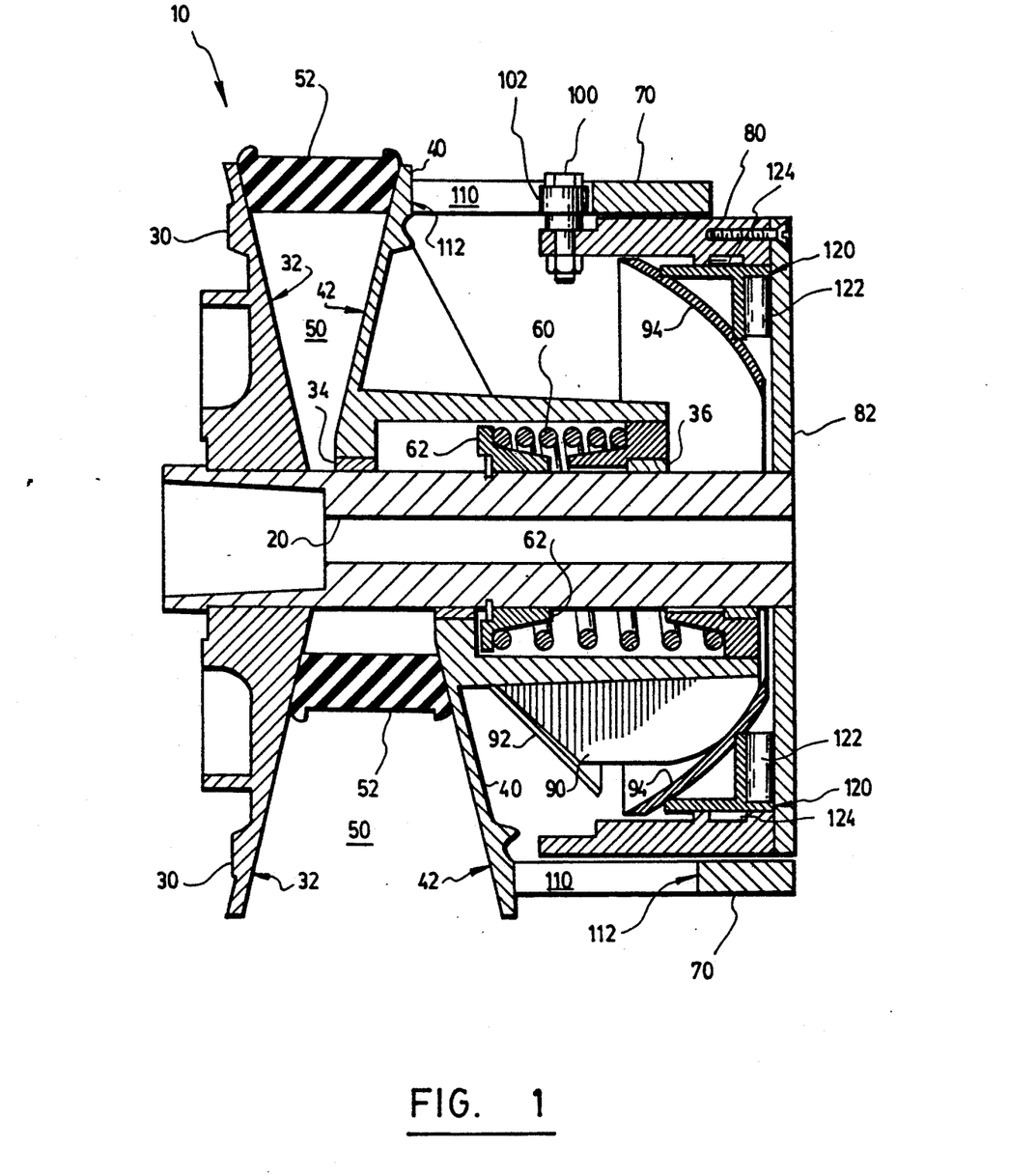
FIG. 1 is a cross-sectional view of the driving pulley, according to the invention, with the upper half in a high ratio position and the lower half in a low ration position.
Figure 2:
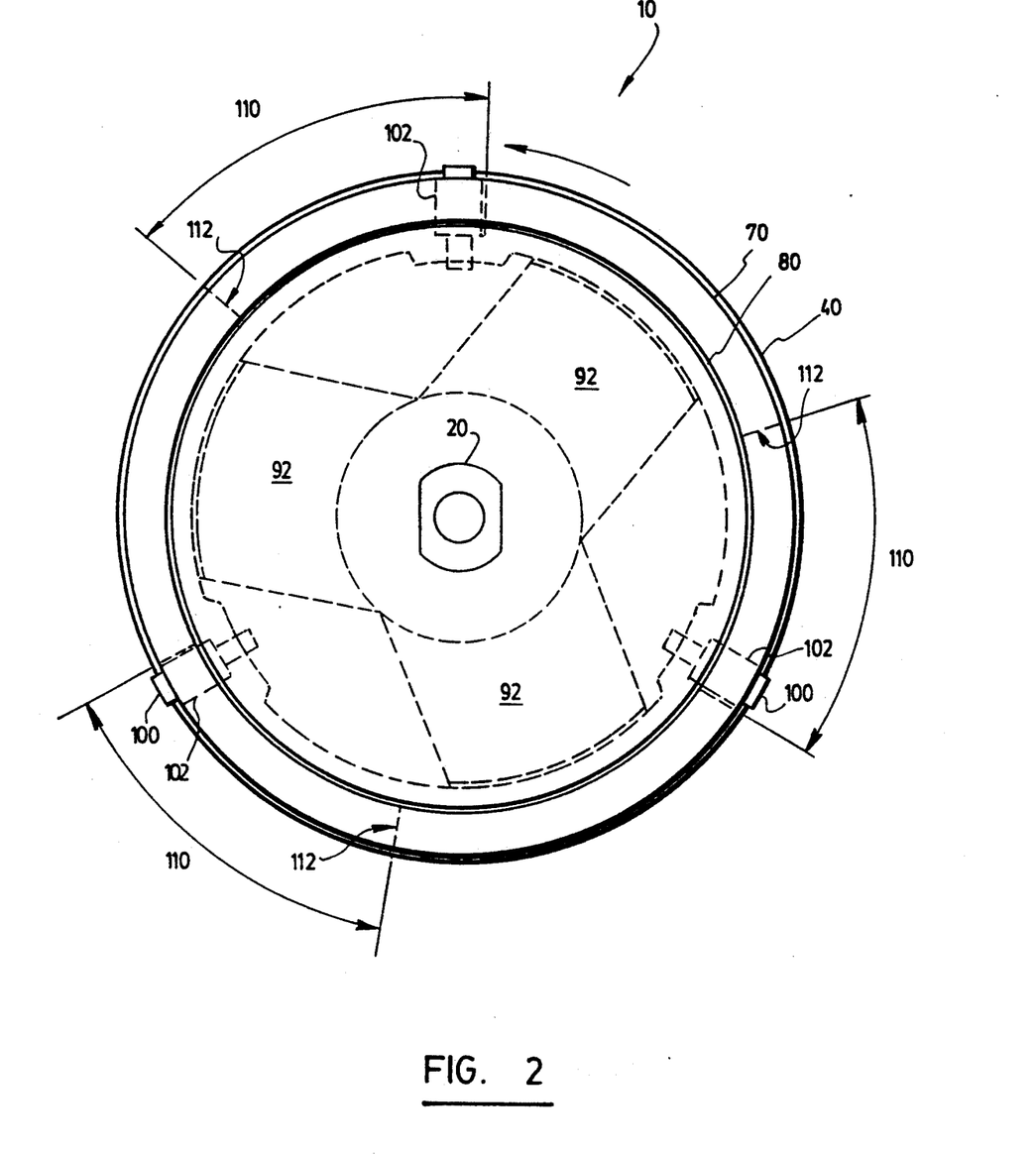
FIG. 2 is a right elevational view of the driving pulley of FIG. 1.

The driving pulley 10 further comprises two coaxial flanges 30 and 40 located on the shaft 20. Each flange 30 or 40 has an inner conical wall, respectively numbered 32 and 42, facing the other. A V-shaped groove 50 is provided between the inner conical walls 32 and 42 for a trapezoidal belt 52 winded around substantially the half of the driving pulley 10. The trapezoidal belt 52 is also winded around a driven pulley (not shown) which is mechanically connected to the wheels, tracks or other suitable moving mechanisms on a vehicle. Upon application of a torque on the shaft 20 by the engine and rotation of the driving pulley 10, substantially radial and tangential forces are exerted on the inner conical walls 32 and 42.

The flange 30, hereinafter called "fixed flange 30", is rigidly attached at one end of the shaft 20. The flange 40, hereinafter called "movable flange 40", is slidably and rotatably mounted on the shaft 20. When accelerating, since the flanges 30 and 40 are substantially identical, about half of the energy is transmitted to the belt 52 by the fixed flange 30 and the other half is transmitted by the movable flange 40. Of course, the same principle applies when decelerating where the kinematic energy of the vehicle is transmitted from the belt 52 to the engine for engine compression braking. The energy is transmitted inside the driving pulley 10 as a torque.

The driving pulley 10 comprises first biasing means for generating a biasing torque opposed to the corresponding half of the torque. It also comprises second biasing means for generating an axial biasing force urging the movable flange 40 away from the fixed flange 30. In the preferred embodiment, the first and second biasing means consist of an helicoidal spring 60 coaxial mounted around the shaft 20. The spring 60 has a first end rigidly attached to the movable flange 40, and another end rigidly attached to the shaft 20 by means of a stopper 62.

The cam 70 is slidably and rotatably mounted on the shaft 20 since it is moving with the movable flange 40. Bushings 34 and 36 are provided between the movable flange 40 and the shaft 20 in order to ease the movement of the movable flange 40. The bearings 34 and 36 may be made of copper or polymer, for example.

Inside the cam 70 is located the inner cylinder 80 which is, as aforesaid, rigidly attached to the shaft 20. Centrifugal means, such as three flyweights 90, are provided between the cam 70 and the inner cylinder 80 for generating an axial moving force opposed to the axial biasing force of the spring 60. The flyweights 90 are symmetrically disposed around the shaft 20 and are movable radially in function of changes in the rotation speed of the driving pulley 10. There are at least two flyweights 90 because it would be very difficult to properly balance the driving pulley 10 with only one flyweight. The inner cylinder 80 is closed by a cover 82.

In the preferred embodiment, the flyweights 90 are V-shaped and are applying a pressure on ramps 92 and 94, respectively located on the cam 70 and on the inner cylinder 80, defining an outwardly convergent V-shaped groove between them. The flyweights 90 are subjected to a centrifugal force due to the rotation of the driving pulley 10. The flyweights 90 then seek their way through the ramps 92 and 94, applying an axial force pushing them away from each other. However, the axial force of the flyweights 90 are counterbalanced by the biasing force of the spring 60 and by an axial biasing force generated by the belt 52 due to the winding tension seeking to move the belt 52 towards the center of the shaft 20. The centrifugal force is directly proportional to the square of the rotation speed of the driving pulley 10. The flyweights 90 are also prevented from moving laterally, with reference to the cam 70, by means of lateral guides (not shown).

According to the invention, means are further provided for limiting sliding and rotating movements of the movable flange 40 within predetermined limits with respect to the shaft 20 and for imposing a specific mechanical behaviour to the movable flange 40. Those means comprise two radial pins 100 rigidly connected to the shaft 20 by the inner cylinder 90.

Each pin 100 is movable within side walls of a surface, preferably having identical shapes. The surfaces are apertures 110, having side walls 112, provided through the cam 70, therefore rigidly connected to the movable flange 40. The pins 100 and apertures 110 are symmetrically disposed about the shaft 20 and provided in the same number, each pin 100 having a corresponding aperture 110 evolving inside its side walls 112.

The pins 100 are outwardly projecting from the inner cylinder 90 and may comprise a roller 102 at the end thereof for reducing friction between the pin 100 and the side walls 112 of the corresponding aperture 100 while resting against the side walls 112.

As aforesaid, the main object of the present invention is to make the driving pulley more torque-sensitive than conventional driving pulleys. To attain this objective, the means for limiting sliding and rotating movements of the movable flange 40 within predetermined limits also convert torque to axial force in order to impose a specific mechanical behaviour to the operation.

Figure 3:
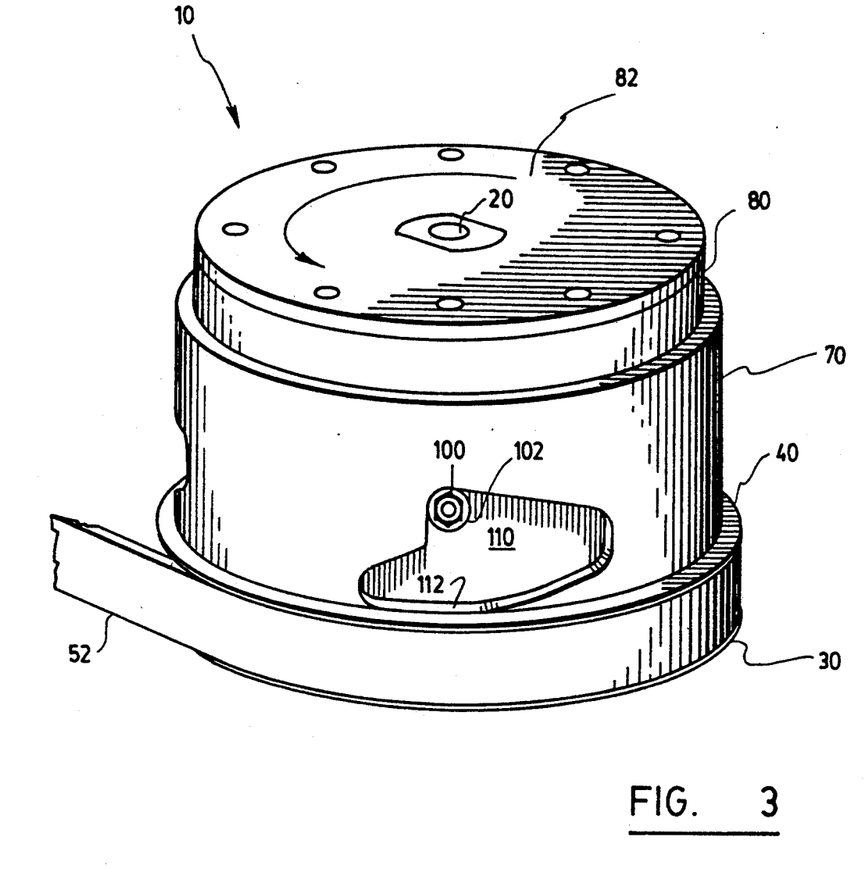
FIG. 3 is a perspective view of the driving pulley of FIG. 1.
Figure 4:
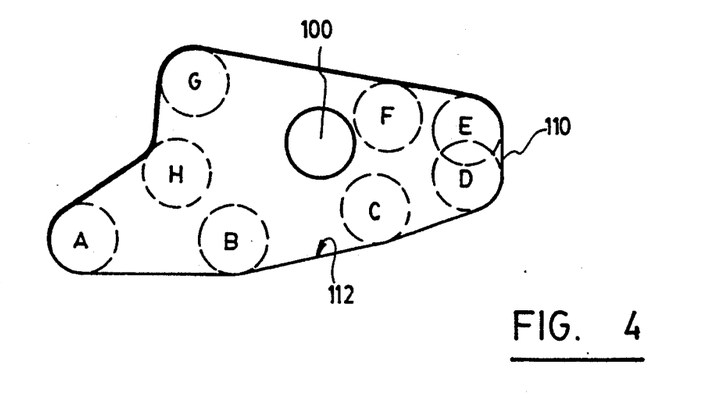
FIG. 4 is an enlarged view of the cam and the inner cylinder showing different pin positions.

As shown in FIGS. 3 and 4, the aperture 110 has a roughly trapezoidal aspect with a prolongation. All the corners of the inner walls 112 are rounded.

Each pin 100 can be moved anywhere inside the aperture 110. Since the pins 100 are rigidly attached to the inner cylinder 80, itself rigidly attached to the shaft 20, and that the cam 70 is rigidly attached to the movable flange 40, it is the apertures 110 that are moved relative to the pins 100. The movable flange 40 and the cam 70 can slide and rotate with reference to the shaft 20 and all other elements rigidly attached thereto. Their movements are limited by the apertures 110.

Since the flyweights 90 are pushing against the cam 70 and the inner cylinder 80, an annular bearing 120 is provided for lowering friction between the flyweights 90 and the inner cylinder 80 upon relative rotational movement between the cam 70 and the inner cylinder 80. The bearing 120 comprises radial rollers 122 and axial rollers 124. The ramp 94 is conical and is mounted on the bearing 120. Of course, it is possible to install the bearing 120 between the flyweights 90 and the cam 70, therefore holding the ramp 94. It is also possible to reduce the friction enough between the ramps 94 and the flyweights 90 with the use of low fiction materials known in the art, such as a polymer, to avoid the use of the bearing. One can also choose that the friction is negligible and does not require any means for reducing it.

FIG. 4 shows a pin 100 in its corresponding aperture 110 at different positions. In FIG. 4, the rotation of the driving pulley 10 is from A to D. The upshift ramp corresponds to B–D, the kickdown ramp corresponds to E–G and the slowdown ramp to A–H.

Position A is when the vehicle is substantially stopped and no torque is applied by the engine. It is in this position because the spring 60 has been previously set to constantly exert a torsional biasing force on the cam 70, forcing it to "turn" in the direction of rotation of the driving pulley 10.

When the driver accelerates the vehicle, the engine generates more torque and sends it to the driving pulley 10. Substantially half of the energy is sent to the belt 52 by the fixed flange 30 while the other half is sent to the belt 52 by the movable flange 40. Therefore, half of the energy has to travel from the shaft 20 to the cam 70. At position A, the only link between the two is the spring 60, which has to counterbalance all that energy transmitted as a torque. From position A, the pin 100 then goes, for example, to position B where the spring 60 is further twisted, thereby generating a higher spring force counterbalancing about half the torque of the engine. At that point, if the pin 100 stays at position B, the equilibrium obtained is expressed as:

$$T_E/2 \approx T_S \qquad (1)$$

where $T_E$ is the torque generated by the engine and $T_S$ is the torque generated by the spring 60 in the opposite direction. It is not equal because there is a small resultant force on the side wall 112 since it defines a small angle with the circumference of the cam 70.

As aforesaid, it is the cam 70 that is moved in the preferred embodiment in FIG. 4, not the pin 100. Therefore, when the pin 100 is shifted from position A to position B, with reference to the cam 70, there is a rotation of the cam 70 and the movable flange 40.

If the engine generates a high torque, the pin 100 may go, for example, to position C. At that point, the higher torque is counterbalanced by a higher counter-balancing torque from the spring 60. The small angle with the circumference of the cam 70 of the inner wall 112 adjacent the pin 100 forces the cam 70 to move axially, bringing the movable flange 40 closer to the fixed flange 30. Hence the flyweights 90 are then "helped" by the pins 100 and the upshift ramp B-D which allow the winding diameter to change even if the rotation speed is low and the flyweights 90 are not yet subjected to a suitable centrifugal force.

If the engine generates an even higher torque, like when the maximum engine torque is required by the driver by selecting the full throttle position, the torque cannot be counterbalanced anymore by the spring 60. At that point, the equation is:

$$T_E/2 > (T_S) \text{ max.} \qquad (2)$$

The pin 100 has no choice but to go against the inner wall 112 opposed to the one near position A. The pin 100 is then, for example, at position D. At that point, the torque generated by the spring 60 is maximum, but unable to counterbalance half of the torque of the engine, as shown in equation 2. The remaining torque is then sent directly to the cam 70 by applying a pressure on the inner wall 112. The approximative force that applies to each pin 100 is given by the following equation:

$$F_P = (T_E/2 - (T_S) \text{ max.}) / (r_C * n) \qquad (3)$$

where $F_P$ is the force applied by each pin, $r_C$ is the radius of the cam 70 and n is the number of pins 100 (and of course the number of apertures 110).

As rotation speed increases, the flyweights 90 become subjected to an increasing centrifugal force, allowing them to move the movable flange 40, and the cam 70, towards the fixed flange 30. As aforesaid, the flyweights 90 generate a resulting axial force counterbalanced by the axial biasing force of the spring 60.

In FIG. 4, position E shows an example of the position of the pin 100 after the cam 70 has been moved by the flyweights 90. At this position, the movable flange 40 will stop moving axially and the engine will speed up until the centrifugal force on the flyweights 90 is sufficient to counterbalance the axial force generated by the pins 100 by the kickdown ramps E-G.

The pin 100 will remain against the right inner wall 112 of the aperture 110 shown in FIG. 4 as long as the axial force of the flyweights 90 is higher than the axial biasing forces of the spring 60 and the belt 52. This is usually the case when the vehicle is travelling at high speeds, such as when travelling on highways.

At position F, the typical ratio is of about 1,5. At position G, the typical ratio is 1,9 and 25% of the torque from the engine goes to the spring 60.

During kickdown at high speeds, the pin 100 will be forced to go down by the kickdown ramp E-G on the right inner wall 112 in FIG. 4, for example, shifting from position G to position F or even position E. Transmission will thus shift to a lower ratio, thereby raising the engine speed.

When the vehicle is slowing down and the pin is at position G, it will move to position H because the axial force generated by the flyweights 90 becomes less important. Therefore, the movable flange 40 is moved away from the fixed flange 30. In position H, the vehicle is not stopped yet, like about 20 km/h for example. At that point, if the vehicle stops completely, the pin 100 will go to position A, forced by the slowdown ramp A-H. If the vehicle reaccelerates, it is in a very good position to do so because it is in the lowest ratio.

Figure 5:
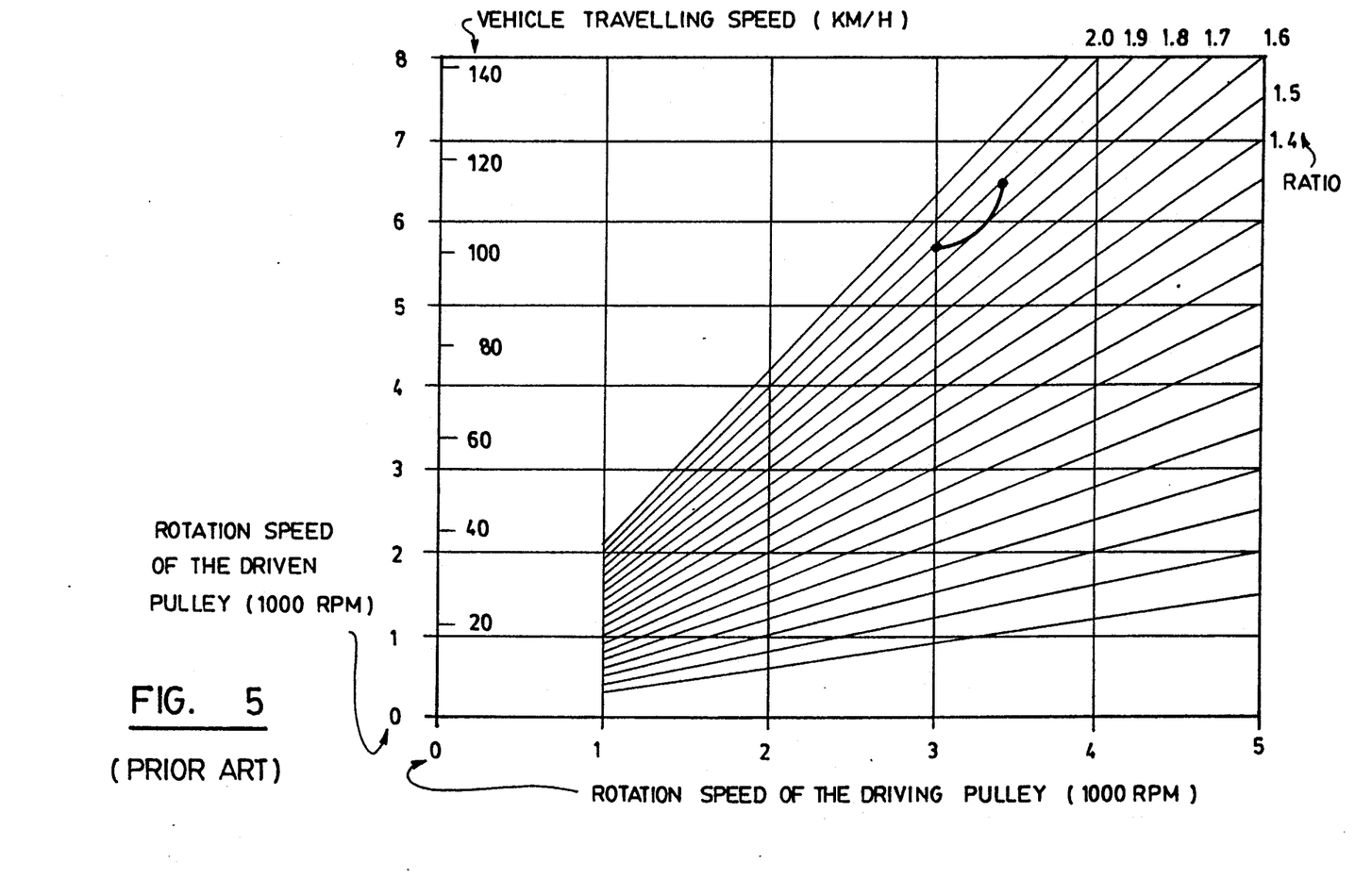
FIG. 5 is a graph of the rotation speed of the driven pulley in function of the rotation speed of the rotation speed of the driving pulley, showing an example of the behaviour of a prior art driving pulley during a kickdown.

FIG. 5 shows an example of a curve of the rotation speed of the driven pulley in function of the rotation speed of a driving pulley of the prior art. Since the driven pulley is mechanically connected to the wheels or tracks of the vehicle, the vehicle speed scale is also given in ordinate. On this graph are also shown the iso-ratio lines.

Figure 6:
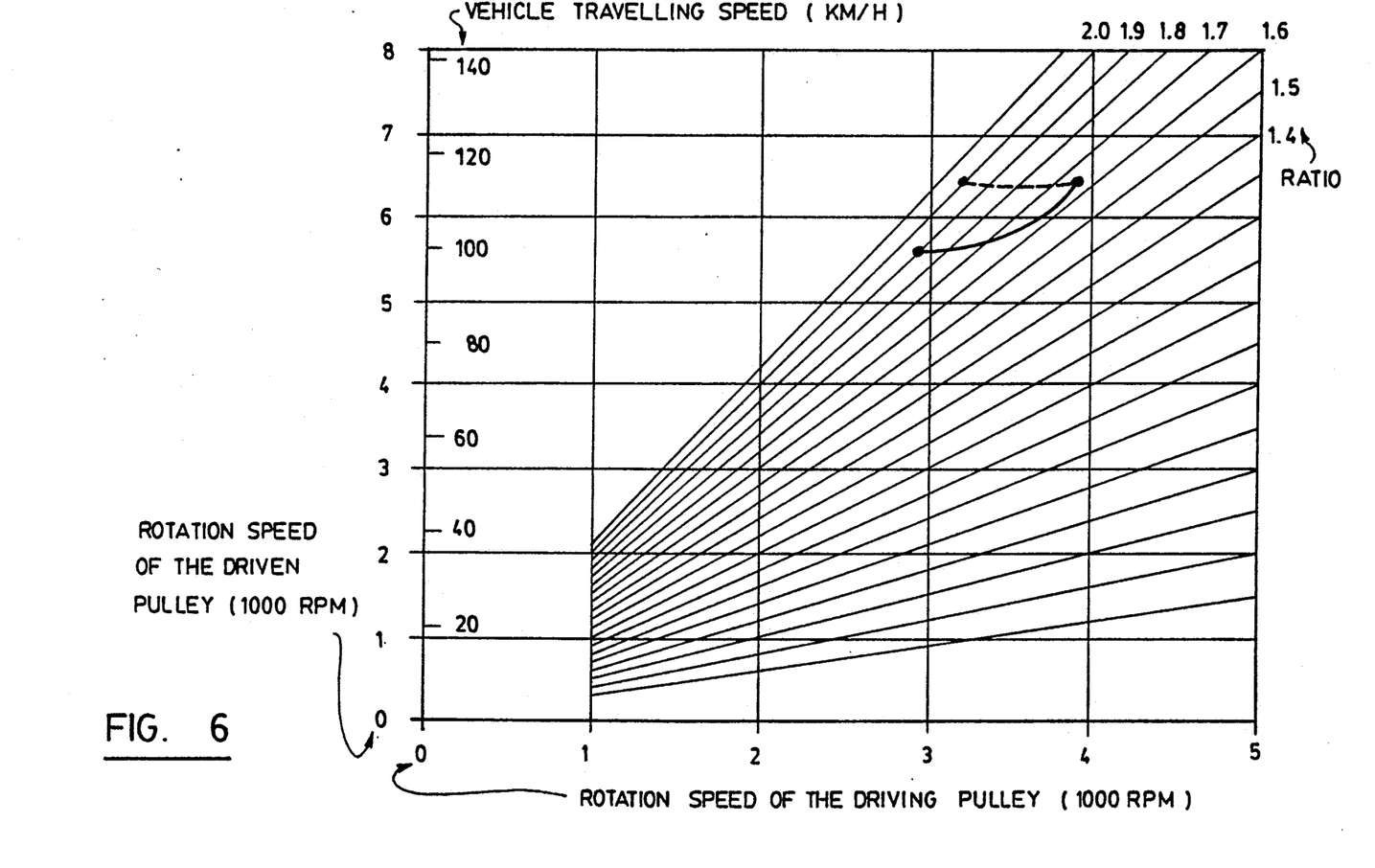
FIG. 6 is a graph of the rotation speed of the driven pulley in function of the rotation speed of the rotation speed of the driving pulley, showing an example of the behaviour of the driving pulley according to the invention during a kickdown.

At 100 km/h, the driving pulley rotates at about 3000 RPM. If the driver wants to accelerate to reach about 115 km/h, for passing another vehicle for instance, then the behavior of the transmission will follow the curve, starting with an initial ratio of 1.9, reaching 1.8 and returning to 1.9 afterwards. Meanwhile, FIG. 6 shows an example of a curve of the rotation speed of the driven pulley in function of the rotation speed of the driving pulley of the present invention. In conditions like the ones of FIG. 5, the curve of the acceleration is at an initial ratio of 1.9, then reaches about 1.65 at 115 km/h. Since the average ratio is lower during the acceleration in FIG. 6 than the average ratio in FIG. 5, the vehicle of FIG. 6 accelerates faster than the vehicle of FIG. 5. In FIG. 6, one can also see that there is still great acceleration potential at 115 km/h. If the driver stops accelerating and chooses to stay at that speed, then the driving pulley will move, setting the transmission to a higher ratio and thereby reducing the engine speed for fuel efficiency. For example, the rotation speed decrease will follow the dotted line of FIG. 6.

Of course, the pin 100 is not always against an inner wall 112, it could be anywhere inside the aperture 110 according to the driving conditions and other factors such as the design of the driving pulley 10, the weight of the vehicle, etc.

Moreover, it is not essential that the surfaces be apertures on the cam 70. The apertures 110 can be on the inner cylinder 80 and the pin 100 on the "cam 70". The apertures can also be grooved patches inside the cam 70 or the inner cylinder 80.

As for the form of the apertures 110, it is a function of the design specifications of the driving pulley and therefore the form is not limited to the one shown in FIG. 4. Other "behaviours" of the driving pulley 10 than the ones described can be obtained using specific shapes.

Therefore, although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

I claim:

1. A driving pulley for a variable speed transmission, said driving pulley comprising:
   a shaft having two ends;
   two coaxial flanges located on said shaft, each flange having an inner conical wall facing the other for providing therebetween a V-shaped groove for a trapezoidal belt exerting substantially a radial force and a tangential force on the inner conical walls upon application of a torque on said shaft and rotation thereof, one of said flanges, hereinafter called "fixed flange", being rigidly attached at one end of said shaft and transmitting substantially the half of the torque, the other flange, hereinafter called "movable flange" being slidably and rotatably mounted on said shaft, said movable flange transmitting substantially the half of the torque;
   first biasing means for generating a biasing torque opposed to the corresponding half of the torque;
   second biasing means for generating an axial biasing force urging said movable flange away from said fixed flange;
   centrifugal means for generating an axial moving force opposed to the axial biasing force and urging said movable flange towards said fixed flange, the axial moving force being a function of the rotation speed of said driving pulley; and
   means for limiting sliding and rotating movements of said movable flange within predetermined limits with respect to said shaft and for imposing a specific mechanical behaviour to said movable flange.

2. A driving pulley according to claim 1, wherein said means for limiting sliding and rotating movements of said movable flange comprise at least two radial pins rigidly connected to said shaft, each of said pins being movable within side walls of a ramp, said pins and ramps being symmetrically disposed about said shaft.

3. A driving pulley according to claim 2, wherein said ramps have identical shapes.

4. A driving pulley according to claim 3, wherein said ramps are rigidly connected to said movable flange, said pins being rigidly connected to said shaft.

5. A driving pulley according to claim 4, wherein said ramps are apertures provided in the periphery of a hollow cylindrical cam rigidly attached to said movable flange.

6. A driving pulley according to claim 5, wherein said pins are outwardly projecting from holding means located within said cam and rigidly attached to said shaft.

7. A driving pulley according to claim 6, wherein each of said pins further comprises a roller means for reducing friction between said pin and said side walls of the corresponding aperture while resting against said side walls.

8. A driving pulley according to claim 1, wherein said centrifugal means comprise at least two flyweights symmetrically disposed around said shaft, each flyweight being moved radially in function of changes in the rotation speed of said driving pulley.

9. A driving pulley according to claim 6, wherein said centrifugal means comprise at least two flyweights symmetrically disposed around said shaft between said cam and said holding means, each flyweight being moved radially in function of changes in the rotation speed of said driving pulley.

10. A driving pulley according to claim 9, wherein said holding means comprise a bearing for lowering friction between said flyweights and said holding means upon relative movement between said cam and said holding means.

11. A driving pulley according to claim 1, wherein said first and second biasing means consist of an helicoidal spring coaxially mounted around said shaft, said spring having a first end rigidly attached to said cam and another end rigidly attached to said holding means.

* * * * *